US012595001B2

(12) United States Patent
Yamanaka et al.

(10) Patent No.: US 12,595,001 B2
(45) Date of Patent: Apr. 7, 2026

(54) VEHICLE BODY STRUCTURE

(71) Applicant: HONDA MOTOR CO., LTD., Tokyo (JP)

(72) Inventors: Yuki Yamanaka, Tokyo (JP); Koji Sato, Tokyo (JP); Kenichi Oishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 455 days.

(21) Appl. No.: 18/464,561

(22) Filed: Sep. 11, 2023

(65) Prior Publication Data

US 2024/0083514 A1     Mar. 14, 2024

(30) Foreign Application Priority Data

Sep. 14, 2022    (JP) ................................. 2022-146230

(51) Int. Cl.
| | |
|---|---|
| *B62D 25/08* | (2006.01) |
| *B60G 21/055* | (2006.01) |
| *B60K 11/08* | (2006.01) |
| *B62D 21/18* | (2006.01) |

(52) U.S. Cl.
CPC ......... *B62D 25/08* (2013.01); *B60G 21/0551* (2013.01); *B60K 11/08* (2013.01); *B62D 21/183* (2013.01)

(58) Field of Classification Search
CPC ...... B60G 21/0551; B60K 11/08; B60K 11/04
See application file for complete search history.

(56) References Cited

U.S. PATENT DOCUMENTS

| | | | | |
|---|---|---|---|---|
| 7,717,495 | B2 * | 5/2010 | Leonard ................. | B62D 25/10 |
| | | | | 180/311 |
| 7,802,816 | B2 * | 9/2010 | McGuire ................ | B60G 7/008 |
| | | | | 180/311 |
| 8,485,303 | B2 * | 7/2013 | Yamamoto ......... | B60G 21/0551 |
| | | | | 180/311 |
| 10,369,861 | B2 | 8/2019 | Deckard et al. | |
| 2013/0087397 | A1 * | 4/2013 | Yamamoto ......... | B60G 21/0551 |
| | | | | 280/124.134 |
| 2014/0103627 | A1 * | 4/2014 | Deckard ................. | B60N 2/58 |
| | | | | 411/362 |
| 2020/0369140 | A1 * | 11/2020 | McCarron ................ | B60K 1/04 |
| 2023/0365215 | A1 * | 11/2023 | Purcell ....................... | B62J 1/12 |

FOREIGN PATENT DOCUMENTS

| | | | | | |
|---|---|---|---|---|---|
| CN | 112298372 | A | * | 2/2021 | ........... B62D 25/084 |
| CN | 115140203 | A | * | 10/2022 | ............. B60K 11/02 |
| JP | S6177524 | A | * | 4/1986 | |
| JP | 2005289225 | A | * | 10/2005 | |
| JP | 2012210894 | A | * | 11/2012 | |
| JP | 2022-081237 | A | | 5/2022 | |

* cited by examiner

*Primary Examiner* — Nicole T Verley
(74) *Attorney, Agent, or Firm* — Rankin, Hill & Clark LLP

(57) ABSTRACT
In the vehicle body structure including a body frame and a stabilizer which is supported by the body frame and connected to left and right front suspension arms, the body frame has an upper frame and a cross member connected to the upper frame, and the upper frame and the cross member are located upward of the front suspension arms. The cross member is connected to an air guide panel for redirecting ambient air flowing from the front of the vehicle body, and the air guide panel is arranged in a position overlapping the stabilizer in a vertical direction.

11 Claims, 10 Drawing Sheets

VEHICLE BODY STRUCTURE

INCORPORATION BY REFERENCE

The present application claims priority under 35 U.S.C. § 119 to Japanese Patent Application No. 2022-146230 filed on Sep. 14, 2022. The content of the application is incorporated herein by reference in its entirety.

TECHNICAL FIELD

The present invention relates to a vehicle body structure.

BACKGROUND ART

A side by side vehicle is known which includes a body frame and a stabilizer that is supported by the body frame and connected to left and right front suspension arms (e.g., PTL 1). The side by side vehicle (SSV) is a type of multi utility vehicles (MUV). Also, in vehicles other than MUV, a vehicle body structure is known which includes an air guide panel for redirecting the traveling air flowing from the front of the vehicle body so that the air guide panel redirects winds passing through a radiator (e.g., PTL 2).

CITATION LIST

Patent Literature

[Patent Literature 1] U.S. patent Ser. No. 10/369,861
[Patent Literature 2] Japanese Unexamined Patent Application Publication No. 2022-81237

SUMMARY OF INVENTION

Technical Problem

Because of the presence of a steering gear box and/or the like, in a lower front portion of the vehicle body, it is difficult to arrange a stabilizer in a lower position. Further, where a vehicle has a mechanism to drive the front wheels or where a vehicle is required to ensure higher road clearance, this makes it more difficult to arrange the stabilizer in a lower position.

If the structures described in PTL 1 and PTL 2 are combined together, the stabilizer and the air guide panel will be arranged one behind another in the longitudinal direction. This will increase the longitudinal length of the vehicle body. Increasing the longitudinal length of the vehicle body will cause a reduction in turning performance and/or impairment of forward visibility.

The present invention has been made in view of the above-mentioned circumstances, and it is an object thereof to facilitate a reduction in longitudinal length of a vehicle body when the configuration includes the stabilizer and the air guide panel.

Solution to Problem

An aspect of the present invention provides a vehicle body structure including: a body frame; and a stabilizer which is supported by the body frame and connected to left and right front suspension arms. The body frame has an upper frame and a cross member connected to the upper frame, the upper frame and the cross member being located upward of the front suspension arms. The cross member is connected to an air guide panel for redirecting ambient air flowing from the front of the vehicle body. The air guide panel is arranged in a position overlapping the stabilizer in the vertical direction.

Advantageous Effects of Invention

In the configuration with the stabilizer and the air guide panel, a reduction in longitudinal length of the vehicle body is facilitated.

DESCRIPTION OF EMBODIMENT

Embodiments according to the present invention will now be described with reference to the accompanying drawings. It is noted that, throughout the description, words for directions such as front, rear, left, right, up and down are used in conformity with directions with respect to the vehicle body unless otherwise stated.

Figure 1:
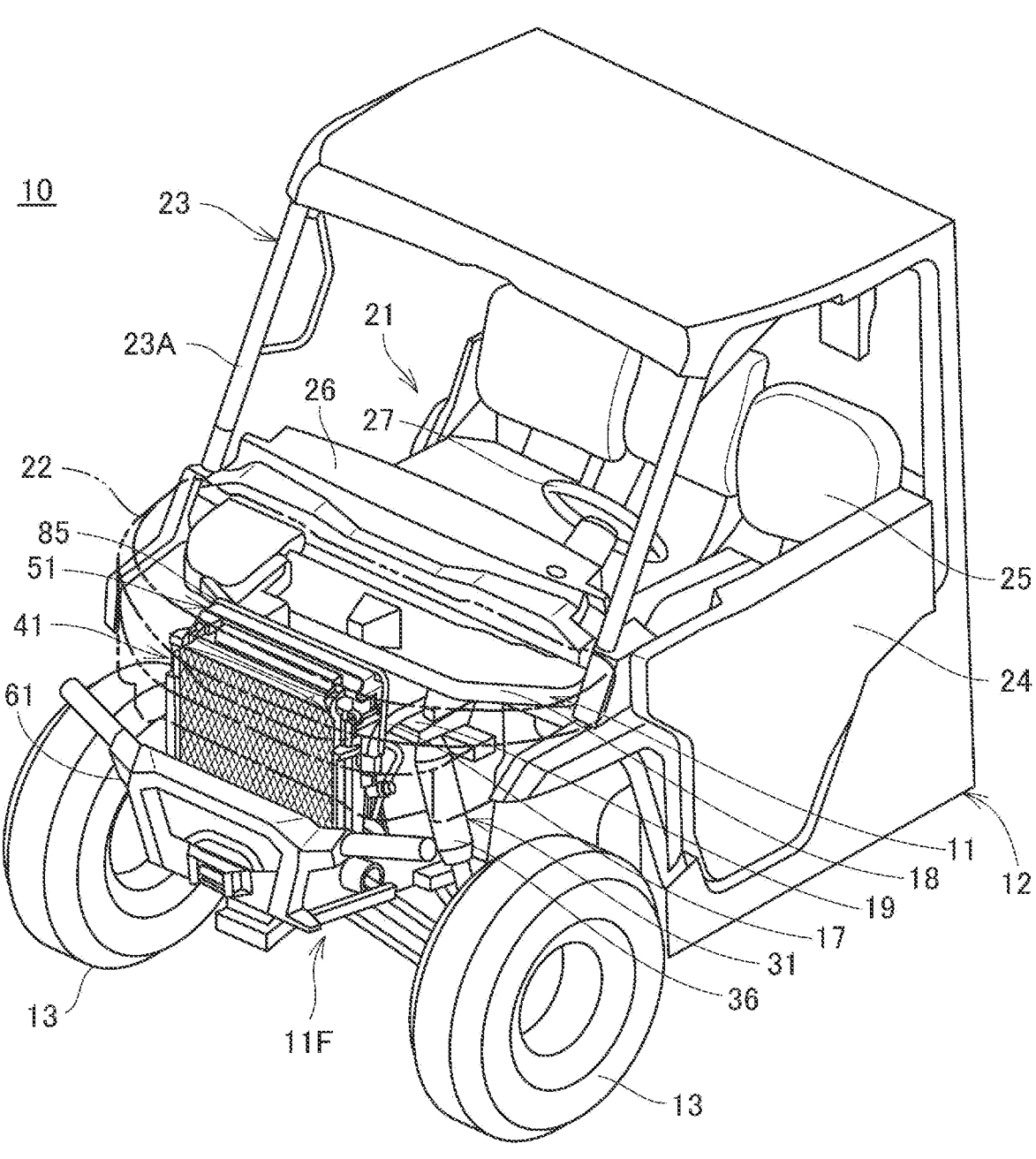
FIG. 1 is a diagram illustrating an ATV having a vehicle body structure according to embodiments of the present invention.

FIG. 1 is a diagram illustrating an ATV having a vehicle body structure according to embodiments of the present invention. An all terrain vehicle 10 (hereinafter referred to as a "vehicle 10") is called a side by side vehicle (SSV), which is a vehicle classified as Multi Utility vehicles (MUV). However, vehicles according to the present invention are not limited to the side by side vehicles and the multi utility vehicles.

The vehicle 10 includes: a body frame 11 serving as a framework; a body 12 covering the body frame 11; a pair of left and right front wheels 13 mounted on the left and right of a front section; a pair of left and right rear wheels mounted on the left and right of a rear section; and a power unit serving as a drive source of wheels made up of the front wheels 13 and the rear wheels. An arbitrary drive source, such as an internal combustion engine, a motor and/or the like, can be applied to the power unit.

The body 12 includes a cabin 21 forming an occupant space, and a front body 22 mounted in front of the cabin 21. The cabin 21 has a pair of left and right doors 24, and a roll bar 23 coupled to the body frame 11. Occupant seats 25, a dashboard 26 and operating members are arranged within the cabin 21, the occupant seat 25 being for an occupant sitting thereon, the dashboard 26 being located in front of the occupant seats 25, the operating members being operated by the occupant such as a steering wheel 27 and the like. The roll bar 23 has a pair of left and right front pillar portions 23A extending upwardly toward the rear from the left and right of the front portion of the cabin 21.

The front body 22 covers the body front section from above and functions as an exterior component, a protective member and the like, the exterior component partly forming the external appearance, the protective member protecting the body front section and/or the like. A front frame portion 11F, a suspension 31, a radiator unit 41, an air guide panel 51, a front bumper 61 and/or the like are arranged under the front body 22, the front frame portion 11F forming part of the body frame 11, the suspension 31 suspending the left and right front wheels 13, the air guide panel 51 arranged in an upper portion of the radiator unit 41, the front bumper 61 located in front of the radiator unit 41. A steering gear box and a power transmission mechanism for driving the front wheels 13 are arranged in a lower portion of the front frame portion 11F.

Figure 2:
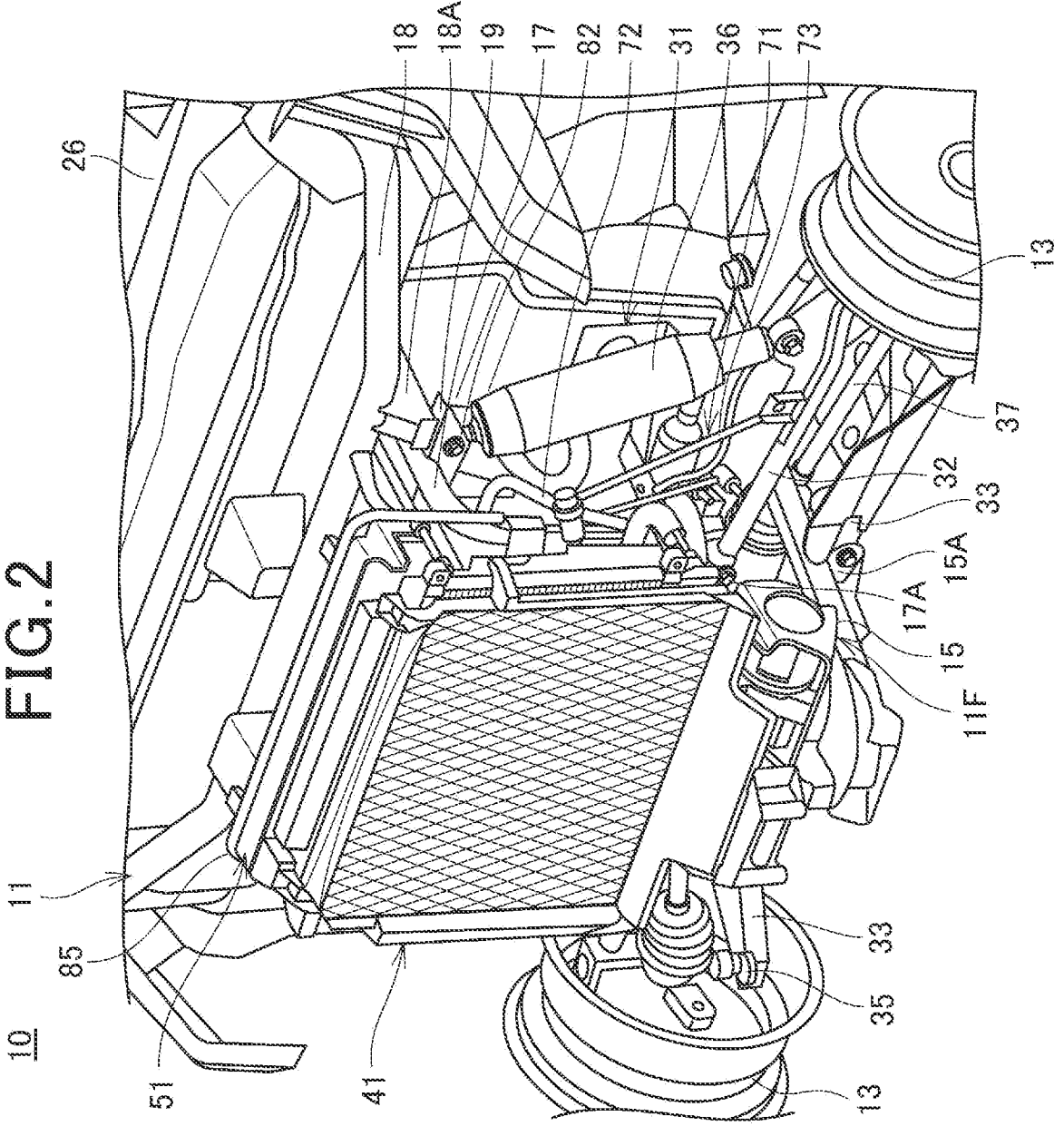
FIG. 2 is a perspective view illustrating a body front section.
Figure 3:
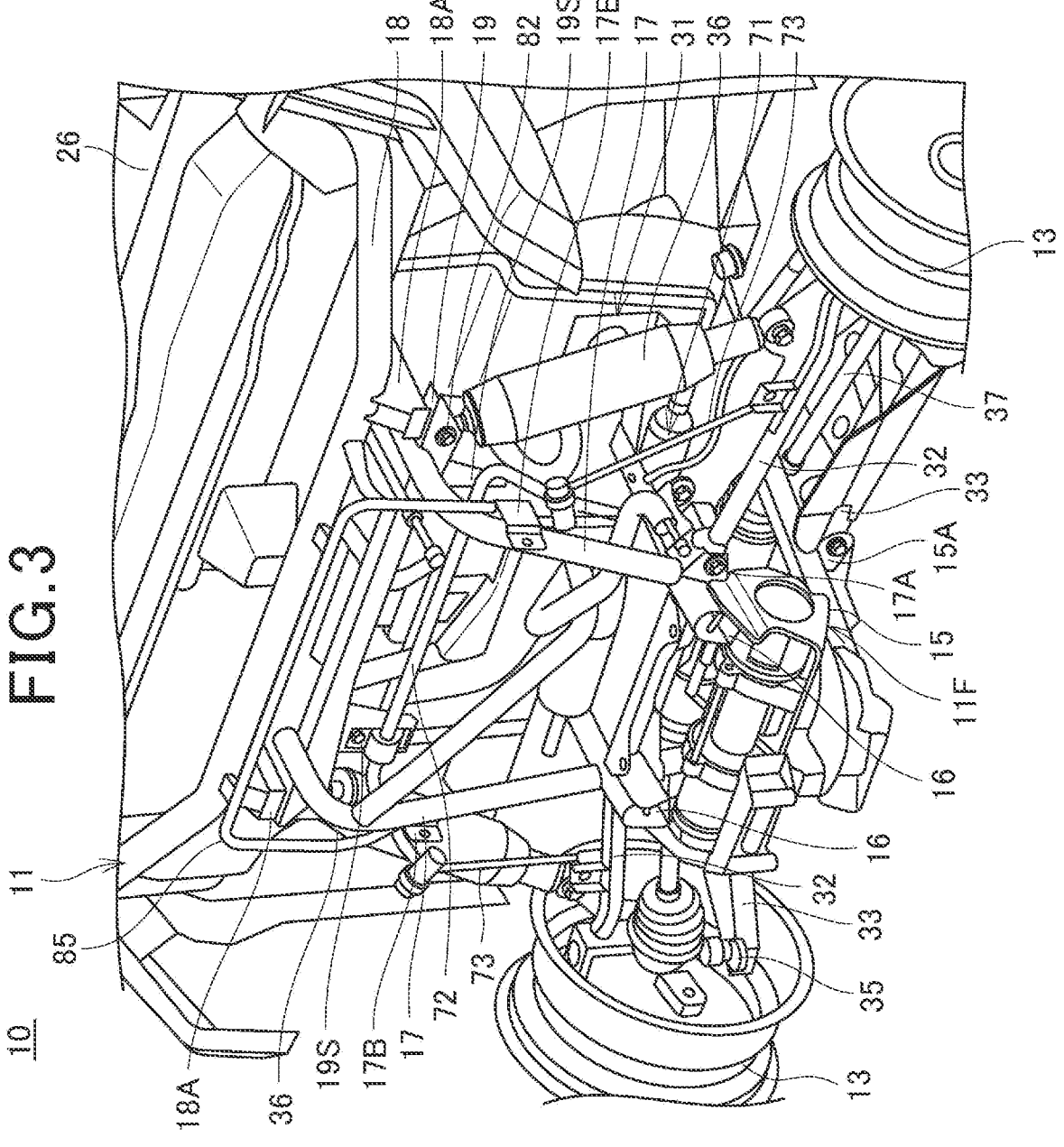
FIG. 3 is a diagram when a radiator unit and an air guide panel are removed from FIG. 2.

FIG. 2 is a perspective view illustrating the body front section. FIG. 3 is a diagram when a radiator unit 41 and an air guide panel 51 are removed from FIG. 2. The front body 22, the front bumper 61 and the like are omitted from FIG. 2 and FIG. 3 for the sake of easier understanding.

As illustrated in FIG. 2 and FIG. 3, the front wheels 13 are suspended from the front frame portion 11F through the suspension 31 of an independent suspension type (double wishbone type). The suspension 31 includes an upper arm 32 and a lower arm 33 which have inner sides in the vehicle width direction rotatably supported on the front frame portion 11F side. The suspension 31 also includes a knuckle 35, a damper 36, and a stabilizer 71, the knuckle 35 being supported on outer sides in the vehicle width direction of the upper arm 32 and the lower arm 33 in order to support pivotally the front wheel 13, the damper 36 being inserted between the upper arm 32 and the front frame portion 11F, the stabilizer 71 reducing the difference of up/down movement between the left and right front wheels 13.

The front frame portion 11F is formed by joining a plurality of steel pipes using welding or the like. As illustrated in FIG. 3, the front frame portion 11F includes: a lower frame 15 extending rearward and forward in a vehicle lower section; a pair of left and right main frames 16 extending rearward and forward above the lower frame 15; a pair of left and right suspension frames 17 supported on the respective main frames 16; an upper frame 18 extending in the vehicle width direction above the main frames 16 and the suspension frames 17; and a cross member 19 connected to the upper frame 18 and extending in the vehicle width direction.

The lower frame 15 rotatably supports an inner end portion in the vehicle width direction of the lower arm 33 via an arm bracket 15A. The suspension frame 17 is formed in a frame shape curved in an inverted U shape as seen in the side view of the vehicle body. The suspension frame 17 has a lower portion rotatably supporting an inner end portion in the vehicle width direction of the upper arm 32 via an arm bracket 17A. A driveshaft 37 forming part of the power transmission mechanism (FIG. 2, FIG. 3) is rotatably supported on the knuckle 35, and an outer end portion in the vehicle width direction of the driveshaft 37 is coupled to a hub of the front wheel 13. Thus, the power of the power unit is transferred to the front wheels 13 via the power transmission mechanism including the driveshaft 37. The vehicle 10 can run with four-wheel drive, but the vehicle 10 may have a switching mechanism allowing switching between four-wheel drive and two-wheel drive.

The upper frame 18 is a frame bridging between a pair of left and right front pillar portions 23A, and has a high rigidity. Here, FIG. 4 is a diagram illustrating part of the cross member 19 and part of the upper frame 18 along with peripheral configuration.

Figure 4:
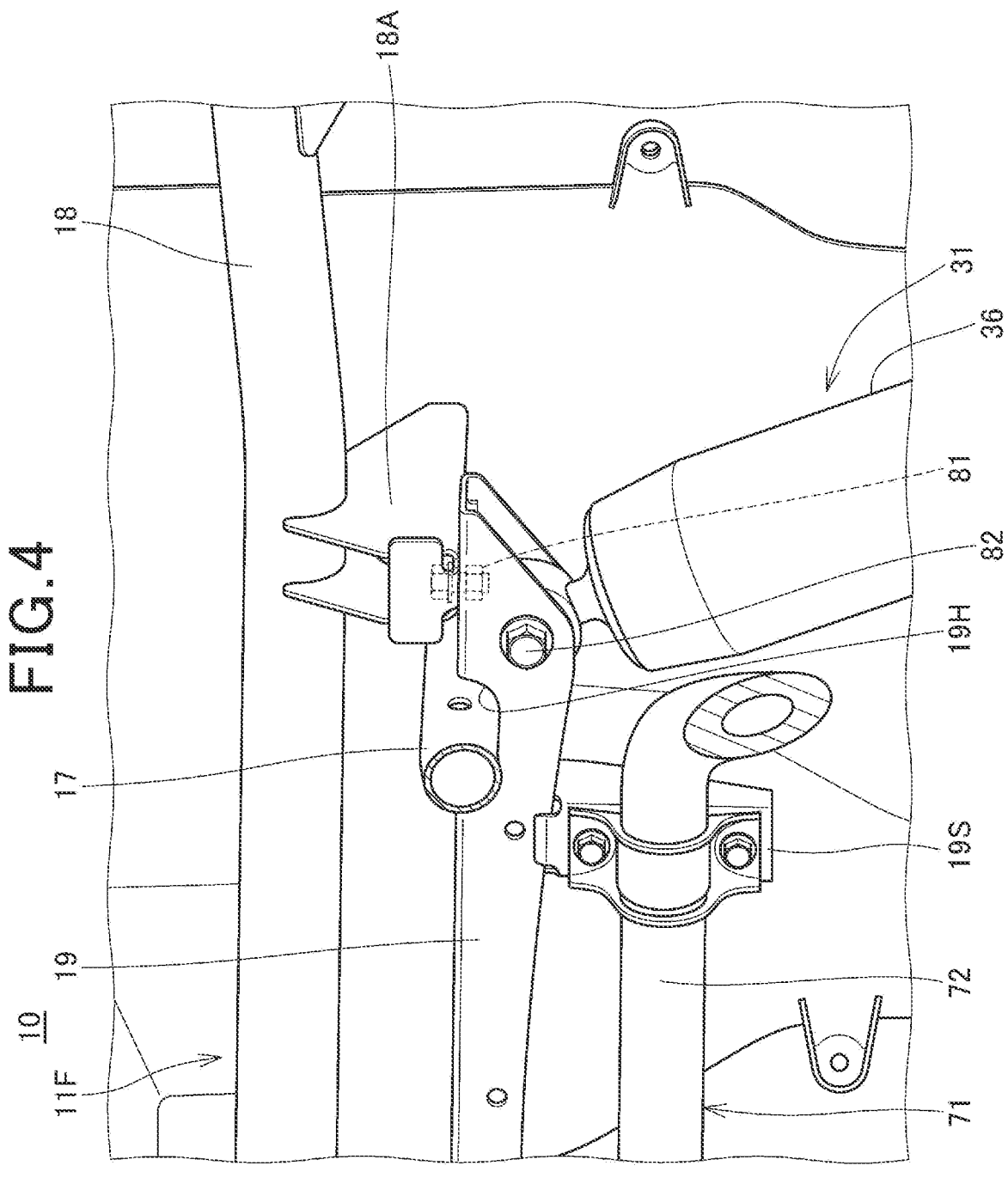
FIG. 4 is a diagram illustrating part of an upper frame and part of a cross member along with peripheral configuration.

As illustrated in FIG. 3 and FIG. 4, the upper frame 18 has a pair of left and right steel sheet made cross member support brackets 18A mounted thereon to be laterally spaced from each other. The cross member support brackets 18A extend downward toward the front from the upper frame 18. The left and right end portions of the cross member 19 abut on the cross member support brackets 18A from below. To maintain the abut state, a fastening member 81 (FIG. 4) is used from under the cross member 19 to fix the cross member 19 to each cross member support bracket 18A. The cross member 19 is formed of metallic material of portal shaped cross section with opening on the lower side, and has a high rigidity.

As illustrated in FIG. 4, downward recessed frame couplers 19H are formed in the upper surface of the cross member 19 and spaced laterally from each other. The cross member 19 and each suspension frame 17 are joined together by welding or the like with the pair of left and right suspension frames 17 fitted to the respective frame couplers 19H. Thus, the cross member 19 functions as a reinforcing frame for reinforcing the upper frame 18, and as a reinforcing frame for bridging between the pair of left and right suspension frames 17, so that the cross member 19 contributes to increased rigidity of the front frame portion 11F.

An upper portion of the damper 36 is attached to each of both end portions in the vehicle width direction of the cross member 19 via a fastening member 82. Further, a pair of left and right stabilizer support portions 19S is mounted between the left and right suspension frames 17 in the cross member 19 to be laterally spaced from each other. The stabilizer support portion 19S extends downward from the cross member 19 to support the stabilizer 71 by a predetermined fastening structure. It is noted that the shape and/or the like of the stabilizer support portion 19S may be changed as appropriate.

The stabilizer 71 includes a torsion bar 72 and a pair of left and right coupling rods 73 (FIG. 3), the torsion bar 72 is supported by the pair of left and right stabilizer support portions 19S, and each coupling rod 73 spans between an outer end portion in the vehicle width direction of the torsion bar 72 and the upper arm 32. The torsion bar 72 and the coupling rod 73, and the coupling rod 73 and the upper arm 32, are each coupled together via a joint such as a ball joint or the like. If an up/down movement occurs in one of the front wheels 13, a similar up/down movement also occurs in the other front wheel 13 via the torsion bar 72, so that a difference of the up/down movement between the left and right front wheels 13 may be minimized.

In the configuration, the stabilizer support portions 19S are mounted on the high rigid cross member 19, so that a high rigid member dedicated to supporting the stabilizer support portion 19S is unnecessary. Furthermore, the stabilizer support portions 19S support the stabilizer 71 under the cross member 19. Therefore, the relatively weighty stabilizer 71 may be arranged in a lower position with respect to the vehicle body. This facilitates achieving a lower height of the center of gravity of the vehicle body. Further, the component placement space (placement space for the later-described air guide panel 51 in the configuration) is easily ensured above the cross member 19.

Figure 5:
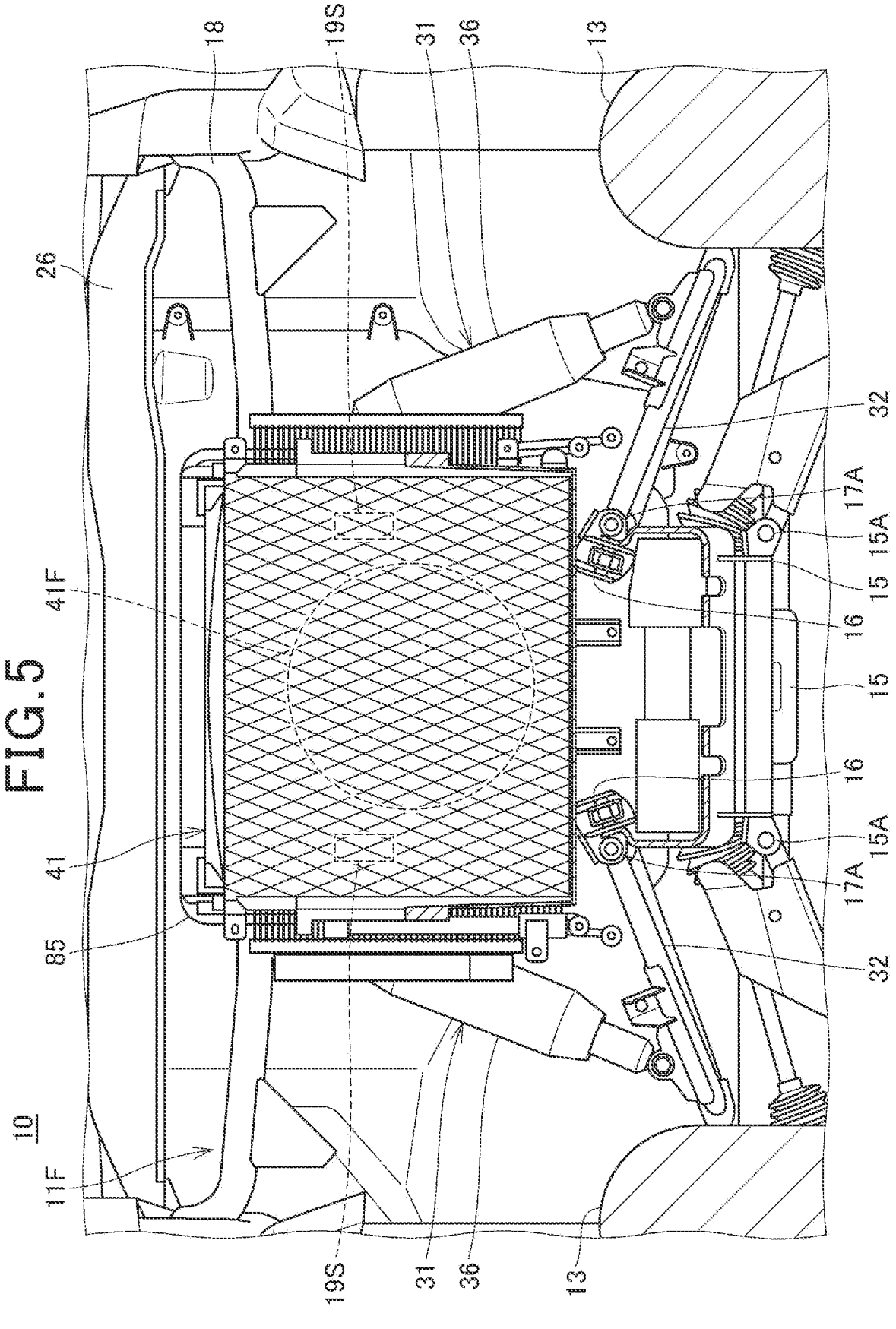
FIG. 5 is a diagram illustrating the radiator unit and peripheral configuration when viewed from the front of the vehicle body.

FIG. 5 is a diagram illustrating the radiator unit 41 and peripheral configuration when viewed from the front of the vehicle body.

As illustrated in FIG. 5, a cooling fan 41F is mounted on the back side of the radiator unit 41. Upon actuation of the fan 41F, ambient air can be forced to flow into the radiator unit 41 from the front of the vehicle body. In the configuration, the pair of left and right stabilizer support portions 19S are located leftward and rightward of the fan 41F as viewed from the front of the vehicle body. Therefore, the pair of left and right stabilizer support portions 19S does not overlap the fan 41F as viewed from the front of the vehicle body, so that the flow of ambient air caused by the fan 41F is not blocked by the stabilizer support portions 19S. As a result, a reduction in fan blast volume may be minimized.

Figure 6:
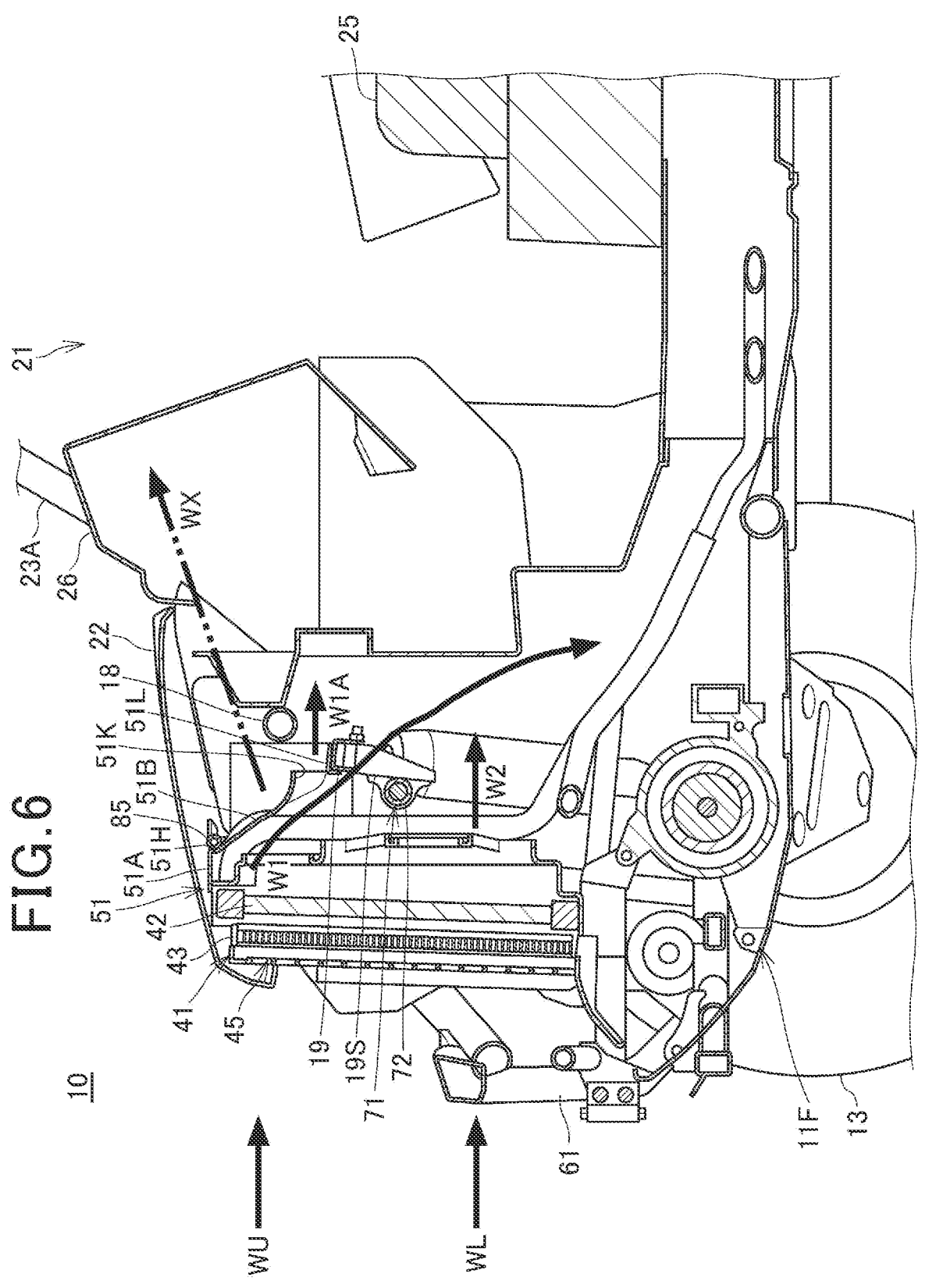
FIG. 6 is a sectional side view illustrating a body front section including the radiator unit.

FIG. 6 is a sectional side view illustrating a body front section including the radiator unit 41. Arrows WU, WL and the like in FIG. 6 schematically indicate the flows of ambient air consisting traveling air entering from the front of the radiator unit 41 during vehicle traveling. It is noted that approximately similar flows of ambient air are also caused during blowing from the fan 41F.

Figure 7:
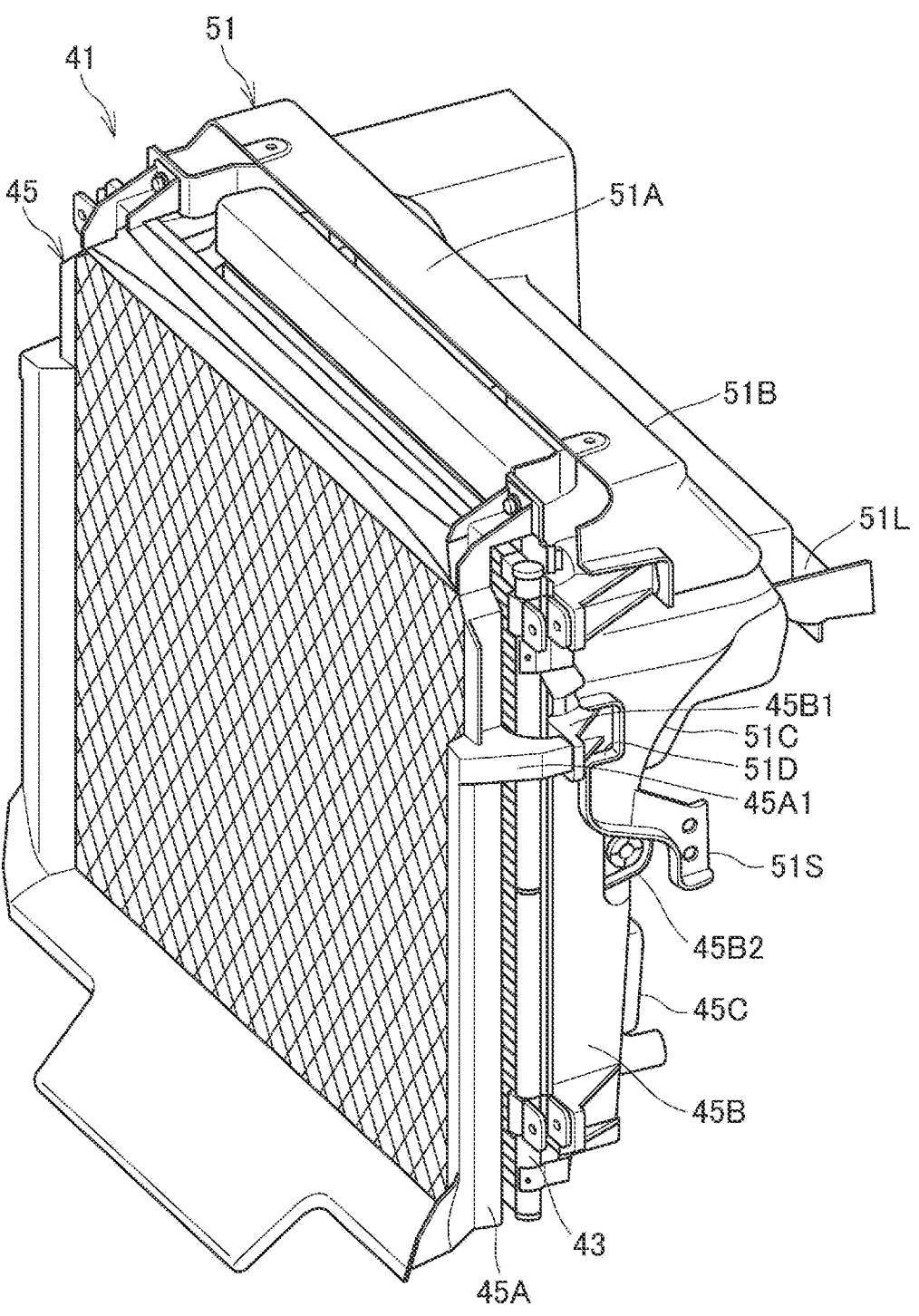
FIG. 7 is a perspective view illustrating the radiator unit when viewed from the front and diagonally from upper left.
Figure 8:
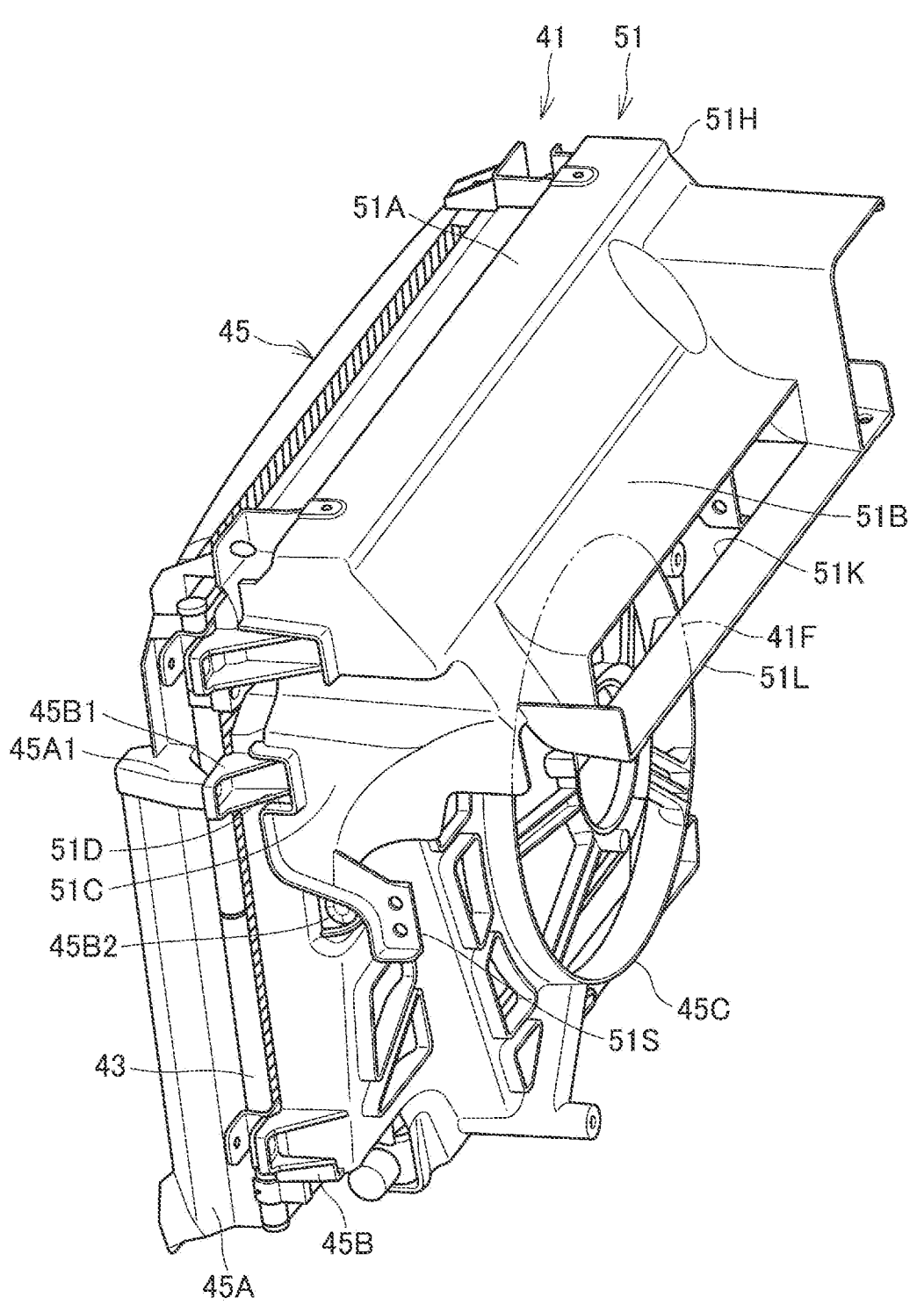
FIG. 8 is a perspective view illustrating the radiator unit when viewed from the rear and diagonally from upper left.
Figure 9:
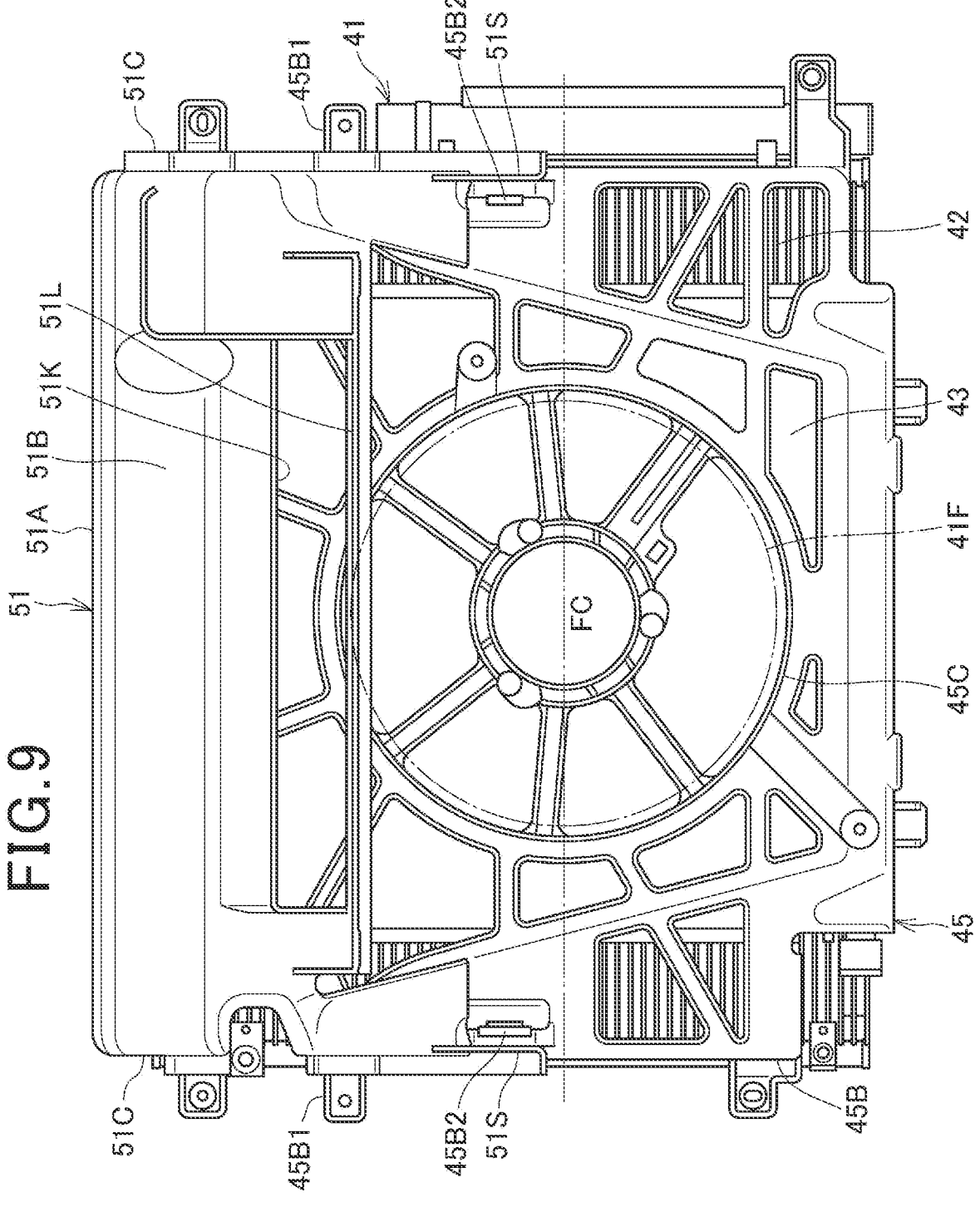
FIG. 9 is a diagram illustrating the radiator unit when viewed from the rear.
Figure 10:
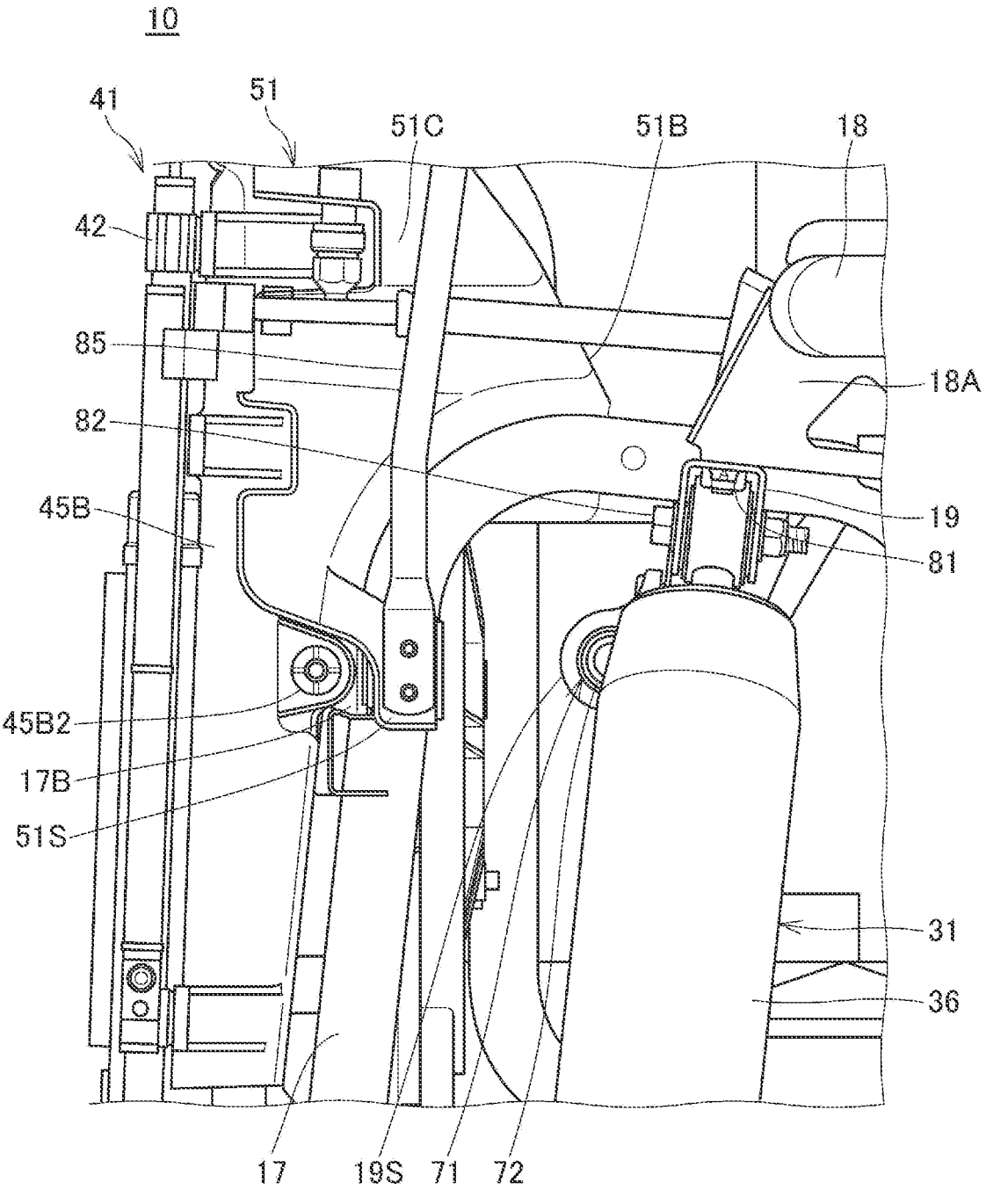
FIG. 10 is a diagram illustrating an installation structure for the radiator unit when viewed from the body left side.

FIG. 7 is a perspective view illustrating the radiator unit 41 when viewed from the front and diagonally from upper left. FIG. 8 is a perspective view illustrating the radiator unit 41 when viewed from the rear and diagonally from upper left. FIG. 9 is a diagram illustrating the radiator unit 41 when viewed from the rear. FIG. 10 is a diagram illustrating an installation structure for the radiator unit 41 when viewed from the body left side.

As illustrated in FIG. 6 to FIG. 9, the radiator unit 41 includes a radiator 42, a capacitor 43, the fan 41F, and a casing 45 supporting them. The radiator 42 is a heat exchanger for cooling the cooling water for the power unit with ambient air. The capacitor 43 is a heat exchanger for cooling a high-pressure coolant for an air conditioner with ambient air. Thus, the vehicle 10 includes an air conditioner for cooling (air conditioning) the interior of the cabin 21. A sufficient flow of ambient air into the radiator unit 41 is desired to achieve appropriate air conditioning by the air conditioner and appropriate cooling of the power unit.

The radiator unit 41 is structured with a rectangular thin radiator 42 arranged facing forward, a rectangular thin capacitor 43 arranged in front of and parallel to the radiator 42, and the fan 41F arranged at the back of the radiator 42 and composed of a propeller fan.

As illustrated in FIG. 7 to FIG. 9, the casing 45 includes a capacitor shroud 45A with a frame shape, a frame shaped radiator shroud 45B that is aligned with and at the back of the capacitor shroud 45A, and a fan casing 45C placed at the back of the radiator shroud 45B and supports the fan 41F. The casing 45 is fixed to a front frame portion 11F in order to support the capacitor 43 and the radiator 42 on the vehicle 10 in positions facing the front of the vehicle body.

The casing 45 is not particularly limited in shape and structure. In the configuration, at least the capacitor shroud 45A and the radiator shroud 45B of the casing 45 are formed individually. As illustrated in FIG. 7 and FIG. 8, on the left and right of the radiator shroud 45B, protuberance portions 45B1 are mounted to protrude leftward and rightward. On the left and right of the capacitor shroud 45A, shroud-fixing stay portions 45A1 are mounted in positions corresponding to the fronts of the respective protuberance portions 45B1. By fixing the protuberance portions 45B1 and the stay portions 45A1 with an appropriate joining structure such as a fastening structure or the like, the capacitor shroud 45A and the radiator shroud 45B are coupled together.

As illustrated in FIG. 10, on the left and right of the radiator shroud 45B, casing fixing stay portions 45B2 are mounted to protrude rearward. Each stay portion 45B2 is fixed to a bracket 17B for the radiator unit with a predetermined fastening member from the outside in the vehicle width direction, the bracket 17B being mounted on each of the left and right suspension frames 17.

Further, an air guide panel side stay portion 51S (FIG. 10) and an air guide panel support member 85 (FIG. 10) are fixed to each of the left and right brackets 17B with a predetermined fastening member from the outside in the vehicle width direction, the air guide panel side stay portion 51S being mounted on the air guide panel 51 located in an upper portion of the radiator unit 41. The air guide panel side stay portion 51S extends downward from each of left and right side plate portions 51C of the air guide panel 51, and is approximately at the center in a front rear position of each side plate portion 51C. In the configuration, the air guide panel side stay portion 51S and the air guide panel support member 85 are fastened, i.e., co-clamped, to the bracket 17B with a common fastening member. This enables a reduction in workload and component count required to fix the air guide panel 51 and the air guide panel support members 85, and also enables a reduction in space required for fixing.

The following description is of the air guide panel 51 and the air guide panel support member 85.

The air guide panel 51 is arranged in an upper portion of the radiator unit 41, and is a member for redirecting the ambient air passing through the radiator unit 41. The air guide panel 51 includes a top plate portion 51A, an inclined plate portion 51B and left and right side plate portions 51C in an integrated fashion, the top plate portion 51A being fixed to the upper portion of the radiator unit 41 by a fastening structure and/or the like, the inclined plate portion 51B being inclined downwardly toward the rear from a rear edge of the top plate portion 51A, the side plate portions 51C covering areas between both end portions of the top plate portion 51A and the inclined plate portion 51B. Each side plate portion 51C has a rearward depressed portion 51D depressed rearward in a position corresponding to each of the protuberance portions 45B1 protruding leftward and rightward from the radiator shroud 45B. The rearward depressed portion 51D is fitted over the protuberance portion 45B1 from the back in order to perform positioning, such as up/down position and the like, of the air guide panel 51 with respect to the radiator unit 41. Also, the rearward depressed portion 51D is slid forward with respect to the protuberance portion 45B1. This facilitates positioning of the air guide panel 51 to the radiator unit 41.

As illustrated in FIG. 9, the inclined plate portion 51B is mounted to cover the rear of an upper portion of the radiator unit 41 across the whole in the width direction of the radiator unit 41, and the inclined plate portion 51B extends to a position where it has no overlap with the fan 41F as viewed from the rear of the vehicle body. The inclined plate portion 51B has, in an integrated fashion, an opening portion 51K in an area overlapping an upper portion of the fan 41F as viewed from the rear of the vehicle body, and the opening portion 51K opens in the longitudinal direction over the approximately entire width of the radiator 42. The opening portion 51K is located upward of the vertical center FC of the fan 41F.

As illustrated in FIG. 2 and FIG. 3, the air guide panel support member 85 is formed of a rodlike member of an inverted U shape with downward open. And, as described above, the air guide panel support member 85 is fixed to the radiator unit bracket 17B (FIG. 10) mounted on the suspension frame 17. The air guide panel support member 85 has an upper portion located at the rear of an upper portion of the air guide panel 51.

As illustrated in FIG. 8 and FIG. 6, a depressed portion 51H is mounted in an upper portion of the air guide panel 51, and the depressed portion 51H is fitted over an upper portion of the air guide panel support member 85. The air guide panel support member 85 is located in the depressed portion 51H, so that the air guide panel 51 is supported to be incapable of moving rearward.

As illustrated in FIG. 6, in the configuration, the inclined plate portion 51B of the air guide panel 51 is located rearward of an upper portion of the radiator unit 41. Therefore, ambient air flows into the radiator unit 41 from the front of the vehicle body, and upper ambient air WU of the ambient air flows toward the air guide panel 51. Then, the ambient air WU passes through the capacitor 43 and the radiator 42. Then, the ambient air WU is guided downwardly toward the rear along the inclined plate portion 51B as indicated by arrow W1 in FIG. 6. Therefore, the ambient air with temperature raised in the radiator unit 41 is inhibited from flowing toward the rear of the inclined plate portion 51B, so that the high-temperature ambient air may be prevented from flowing toward the occupant side.

If there is no air guide panel 51, as indicated by dash-dot-dot arrow WX in FIG. 6, high-temperature ambient air will flow toward the occupant side corresponding to the dashboard 26 side. Thus, a rise in temperature within the cabin 21 is easily caused.

As illustrated in FIG. 8, the inclined plate portion 51B of the air guide panel 51 has a portion above the opening portion 51K, and the portion is formed in an inclined shape inclined downward toward the rear. On the other hand, of the inclined plate portion 51B, a lower rear portion on the opposite side of the opening portion 51K is formed of a plate shaped member 51L that extends in the vehicle width direction along the lower line of the opening portion 51K and extends horizontally toward the rear. The plate shaped member 51L forms a partition member for partitioning off a lower edge of the opening portion 51K, and a lower rear portion of the air guide panel 51. The plate shaped member 51L is located on an upper surface of the cross member 19, and is fixed to the cross member 19 using an appropriate joining structure such as a fastening structure or the like.

Since the air guide panel 51 is fixed to the cross member 19 with high rigidity, the support strength of the air guide panel 51 is enhanced.

In the configuration, as illustrated in FIG. 10, the air guide panel 51 is located above the cross member 19 and also in a position overlapping the cross member 19 in the vertical direction. Also, the stabilizer 71 is located in a position below the cross member 19 and also close to the cross member 19, and overlaps the air guide panel 51 in the vertical direction. Since the air guide panel 51 and the stabilizer 71 overlap each other in the vertical direction, a reduction of the longitudinal space required to install them may be enabled. Therefore, as compared with the configuration in which the air guide panel 51 and the stabilizer 71 are arranged one behind another in the longitudinal direction, a reduction of the longitudinal length of the vehicle body may be enabled.

Also, since the air guide panel 51 is mounted with an opening portion 51K opening rearward, as indicated by arrow W1A in FIG. 6, a portion of the ambient air W1 guided downward toward the rear along the inclined plate portion 51B may be allowed to escape rearward from the opening portion 51K.

It is noted that, since the opening portion 51K is mounted in the rear lower portion of the air guide panel 51, in other words, mounted in a most downstream position of the inclined plate portion 51B, the high-temperature ambient air may be sufficiently inhibited from flowing toward the occupant side which is the dashboard 26 side. Therefore, a rise in temperature within the cabin 21 may be inhibited.

As illustrated in FIG. 6, after the lower ambient air WL flowing toward the air guide panel 51 passes through the capacitor 43 and the radiator 42, the lower ambient air WL becomes ambient air W2 to merge with the ambient air W1 guided to the inclined plate portion 51B. In the configuration, since a portion of the ambient air W1 escapes rearward from the opening portion 51K, a reduction in velocity of flow may be decreased in an area where the ambient airs W1 and W2 merge together. For example, this is effective in decreasing a reduction in velocity of flow of the ambient air passing through a central area of the capacitor 43 and the radiator 42. This enables an increase in velocity of flow of the ambient air passing through the central area of the capacitor 43 and the radiator 42 and/or the like. Therefore, the utilization rate of the heat exchanger made up of the capacitor 43 and the radiator 42 may be increased. This offers an advantage of air conditioning by the air conditioner and cooling of the power unit.

As described above, in the embodiment, the body frame 11 has the upper frame 18 and the cross member 19 connected to the upper frame 18 and extending in the vehicle width direction, and the upper frame 18 and the cross member 19 are located upward of the upper arm 32 which is one of the front suspension arms. And, the air guide panel 51 redirects ambient air flowing from the front of the vehicle body, and the air guide panel 51 is connected to the cross member 19. The air guide panel 51 is arranged in a position overlapping the stabilizer 71 in the vertical direction.

With the configuration, the cross member 19 connected to the upper frame 18 is used to support the air guide panel 51, and also, in the body structure including the stabilizer 71, a reduction in longitudinal space required for arranging the air guide panel 51 and the stabilizer 71 is enabled, thus a reduction of the longitudinal length of the vehicle body is facilitated. Reducing the longitudinal length of the vehicle body may enable an improvement in turning performance, an improvement in forward visibility, and the like.

Also, the stabilizer support portion 19S is located below the cross member 19, and the stabilizer 71 is supported by the stabilizer support portion 19S. With the configuration, the height of the center of gravity of the vehicle body may be easily reduced by the stabilizer 71 being located below the cross member 19. Also, the air guide panel 51 and the stabilizer 71 may be arranged separately above and below the cross member 19, so that the contact between the stabilizer 71 and the air guide panel 51 is easily inhibited.

Also, the air guide panel 51 is a member for guiding at least one portion of the high temperature ambient air passing through the capacitor 43 and the radiator 42, and the air guide panel 51 has the fan 41F at the back of the capacitor 43 and the radiator 42. And, the stabilizer support portion 19S is arranged in a position without overlapping the fan 41F as viewed from the front of the vehicle body. With the configuration, the flow of ambient air caused by the fan 41F is not blocked by the stabilizer support portion 19S, and a reduction in fan blast volume may be inhibited.

Also, the air guide panel 51 includes the inclined plate portion 51B inclined downward toward the rear, and the inclined plate portion 51B overlaps the stabilizer 71 in the vertical direction. With the configuration, the inclined plate portion 51B may inhibit the high-temperature ambient air from flowing toward the occupant located rearward of the air guide panel 51. And also, the longitudinal space required to arrange the inclined plate portion 51B and the stabilizer 71 may be minimized.

Also, the lowering of the center of gravity of the vehicle body may be easily achieved by arrangement of the stabilizer 71 below the air guide panel 51.

It is noted that the inclined plate portion 51B corresponds to an "inclined portion" in the disclosure. The inclined portion is not limited to the shape of the inclined plate portion 51B and the structures, and an appropriate shape inclined downward toward the rear to guide ambient air from the front of the vehicle body and structure may be adoptable.

Also, the air guide panel 51 includes the opening portion 51K in the inclined plate portion 51B, and the opening portion 51K opens rearward. With the configuration, at least one portion of the ambient air guided to the inclined plate portion 51B may be escaped rearward from the opening portion 51K, so that a reduction in velocity of flow may be decreased in an area where the ambient air W1 guided to the inclined plate portion 51B and another ambient air W2 merge together. As a result, the velocity of flow of ambient air passing through the capacitor 43 and the radiator 42 may be increased to increase the utilization rate of the capacitor 43 and the radiator 42.

Also, the opening portion 51K is located upward of the vertical center FC of the fan 41F. With the configuration, at least one portion of the ambient air guided to the inclined plate portion 51B may be escaped before merging with the ambient air W2 at the back of the fan 41F, so that a reduction in fan blast volume may be inhibited.

Also, the opening portion 51K is located downward of the upper frame 18. With the configuration, the high-temperature ambient air passing through the opening portion 51K may be inhibited from impinging on the upper frame 18 to flow upward. Therefore, the high temperature ambient air is inhibited from flowing toward the occupant.

Also, the opening portion 51K is connected to the cross member 19. With the configuration, an area of the opening portion 51K is a portion where the rigidity of the air guide panel 51 is easily reduced relatively. However, since the opening portion 51K is connected to the cross member 19, the opening portion 51K may be inhibited from deforming.

Also, the plate shaped member 51L functions as a partition member for partitioning off the lower edge of the opening portion 51K, and extends rearward. Therefore, the ambient air passing through the opening portion 51K is inhibited from re-merging with the ambient air guided to the inclined plate portion 51B. This facilitates an increase in velocity of flow of the ambient air passing through the capacitor 43 and the radiator 42.

Also, the left and right suspension frames 17 are included to support the left and right upper arms 32, respectively. The left and right suspension frames 17 are each formed in an inverted U shape as seen in the side view of the vehicle body. The cross member 19 is connected to undersides of the respective suspension frames 17 to bridge between the suspension frames 17. With the configuration, this facilitates ensuring a sufficient frame strength for a load (e.g., an input load from the damper 36) acting on the suspension frames 17 from below, and also facilitates achieving a lower height of the center of gravity of the vehicle body. Also, since a shrine gate shape (which can be referred to as a "robust gate shape") may be formed of the upper frame 18, the cross member 19 and the suspension frames 17, greater frame rigidity is easily provided.

Also, the air guide panel 51 has the depressed portion 51H. The air guide panel support member 85 is located in the depressed portion 51H and is connected to the suspension frames 17. With the configuration, since the air guide panel support member 85 may restrict the movement of the air guide panel 51, the support force of the air guide panel 51 may be increased.

Further, an end of each of the left and right dampers 36 partially forming the left and right suspensions 31 is attached to the cross member 19. With the configuration, the load acting from the left and right dampers 36 may be received by the body frame 11 including the cross member 19 and the suspension frames 17, so that the excessive deformation of the body frame 11 is easily minimized.

The above embodiments illustrate an aspect of the present invention, and various changes may be made without departing from the spirit and scope of the present invention, such as substitution of a well-known element for an element of the embodiments, and the like.

For example, the configuration and the shape of each portion of the vehicle 10 may be changed as appropriate. For instance, the radiator unit 41 has been illustrated as including a plurality of heat exchangers including the radiator 42 and the capacitor 43, but the types and the number of heat exchangers may be changed as appropriate.

Also, various drive sources can be utilized as the power unit. If the power unit is not of a water cooled type, the power unit is configured without the radiator. Also, if the vehicle 10 includes no air conditioner, the vehicle is configured without the capacitor. Also, as the heat exchanger, an oil cooler may be included to cool, with ambient air, oil lubricating the power unit and/or the like. It is noted that the radiator unit 41 can be presented as a heat exchanger unit and a cooler.

Also, the suspension 31 may be of any type other than a double wishbone type, and the structure and the shape of each portion of the body frame 11 may be changed as appropriate. Also, the present invention is widely applicable to any vehicle body structure including the stabilizer 71 that is supported by the body frame 11 and connected to the left and right suspension arms, and the air guide panel 51 for redirecting the ambient air flowing from the front of the vehicle body.

Configuration Supported by the Above-Described Embodiments

The above-described embodiments support the following configurations.

Configuration 1

In a vehicle body structure including a body frame and a stabilizer that is supported by the body frame and connected to left and right front suspension arms, the body frame has an upper frame and a cross member connected to the upper frame. The upper frame and the cross member are located upward of the front suspension arms. The cross member is connected to an air guide panel for redirecting ambient air flowing from the front of the vehicle body. The air guide panel is arranged in a position overlapping the stabilizer in the vertical direction.

With the configuration, in the configuration that utilizes the cross member connected to the upper frame to support the air guide panel, and also includes the stabilizer, the longitudinal space required to arrange the air guide panel and the stabilizer may be reduced. This facilitates a reduction in longitudinal length of the vehicle body. Reducing the longitudinal length of the vehicle body may enable an improvement in turning performance, an improvement in forward visibility, and the like.

Configuration 2

The vehicle body structure described in the configuration 1 has a stabilizer support portion located below the cross member, and the stabilizer is supported by the stabilizer support portion.

With the configuration, the height of the center of gravity of the vehicle body may be easily reduced by the stabilizer being located below the cross member. Further, the air guide panel and the stabilizer may be arranged separately above and below the cross member. This facilitates inhibiting contact between the stabilizer and the air guide panel.

Configuration 3

In the vehicle body structure described in the configuration 2, the air guide panel is a member for guiding at least one portion of ambient air passing through a heat exchanger. The air guide panel has a fan located at the back of the heat exchanger. The stabilizer support portion is arranged in a position without overlapping the fan as viewed from the front of the vehicle body.

With the configuration, the flow of ambient air caused by the fan is not blocked by the stabilizer support portion, so that a reduction in fan blast volume can be minimized. This facilitates a flow of sufficient ambient air into the heat exchanger.

Configuration 4

In the vehicle body structure described any one of the configurations 1 to 3, the air guide panel includes an inclined portion inclined downward toward the rear, and the inclined portion overlaps the stabilizer in the vertical direction.

With the configuration, ambient air is raised in temperature by passing through the heat exchanger such as the radiator and/or the like, and the high-temperature ambient air is inhibited by the inclined portion from flowing toward the occupant side rearward of the air guide panel. And also, the longitudinal space required to arrange the inclined portion and the stabilizer can be minimized.

Also, the stabilizer is arranged downward of the air guide panel. Thereby the lowering of the center of gravity of the vehicle body is easily achieved.

Configuration 5

In the vehicle body structure described in the configuration 4, the air guide panel includes an opening portion formed in the inclined portion to open rearward.

With the configuration, at least one portion of the ambient air guided to the inclined portion is escaped rearward from the opening portion. Therefore, a reduction in velocity of flow may be decreased in an area where the ambient air guided to the inclined portion and another ambient air merge together. Thereby, the velocity of flow of ambient air passing through the heat exchanger may be increased to increase the utilization rate of the heat exchanger.

Configuration 6

In the vehicle body structure described in the configuration 5, the opening portion is located upward of the vertical center of the fan.

With the configuration, at least one portion of the ambient air guided to the inclined portion may be escaped before merging with ambient air at the back of the fan, so that a reduction in fan blast volume can be minimized.

Configuration 7

In the vehicle body structure described in the configuration 5 or 6, the opening portion is located downward of the upper frame.

With the configuration, the high-temperature ambient air passing through the opening portion can be inhibited from impinging on the upper frame and then flowing upward. Therefore, the high temperature ambient air can be inhibited from flowing toward the occupant.

Configuration 8

In the vehicle body structure described in any one of the configurations 1 to 7, the opening portion is connected to the cross member.

With the configuration, an area of the opening portion is a portion where the rigidity of the air guide panel is easily reduced relatively. However, since the opening portion is connected to the cross member, the opening portion can be inhibited from deforming.

Configuration 9

The vehicle body structure described in any one of the configurations 1 to 8 has left and right suspension frames respectively supporting the left and right front suspension arms. The left and right suspension frames are each formed in an inverted U shape as seen in the side view of the vehicle body. The cross member is connected to undersides of the respective suspension frames to bridge between the suspension frames.

With the configuration, this facilitates ensuring a sufficient frame strength for a load acting on the suspension frames from below, and also facilitates achieving a lower height of the center of gravity of the vehicle body.

Also, since a shrine gate shape (which can be referred to as a "robust gate shape") is formed of the upper frame, the cross member and the suspension frames, greater frame rigidity is easily provided.

Configuration 10

In the vehicle body structure described in the configuration 9, the air guide panel has a depressed portion. The air guide panel support member is located in the depressed portion and connected to the suspension frame.

With the configuration, since the air guide panel support member can restrict the movement of the air guide panel, the support force of the air guide panel can be increased.

Configuration 11

In the vehicle body structure described in any one of the configurations 1 to 10, one end of each of left and right dampers forming partially left and right suspensions is attached to the cross member.

With the configuration, the load acting from the left and right dampers can be received by the body frame including the cross member and the suspension frames, so that the excessive deformation of the body frame is easily minimized.

REFERENCE SIGNS LIST

10: all terrain vehicle
11: body frame
11F: front frame portion
12: body
13: front wheel (wheel)
17: suspension frame
18: upper frame
19: cross member
19S: stabilizer support portion
25: occupant seat
26: dashboard
27: steering wheel
31: suspension
32: upper arm (front suspension arm)
33: lower arm
36: damper
41: radiator unit (heat exchanger unit, cooler)
41F: fan
42: radiator (heat exchanger)
43: capacitor (heat exchanger)
45: casing
51: air guide panel
51A: top plate portion
51B: inclined plate portion (inclined portion)
51C: side plate portion
51K: opening portion
51H: depressed portion
71: stabilizer
85: air guide panel support member

The invention claimed is:

1. A vehicle body structure, comprising:
a body frame; and
a stabilizer that is supported by the body frame and connected to left and right front suspension arms,
wherein
the body frame has an upper frame and a cross member connected to the upper frame,
the upper frame and the cross member being located upward of the front suspension arms,
the cross member is connected to an air guide panel for redirecting ambient air flowing from a front of a vehicle body, and
the air guide panel is arranged in a position overlapping the stabilizer in a vertical direction.

2. The vehicle body structure according to claim 1,
further comprising a stabilizer support portion located below the cross member,
wherein the stabilizer is supported by the stabilizer support portion.

3. The vehicle body structure according to claim 2, wherein
the air guide panel is a member for guiding at least one portion of ambient air passing through a heat exchanger,
the air guide panel has a fan located at the back of the heat exchanger, and
the stabilizer support portion is arranged in a position without overlapping the fan as viewed from the front of the vehicle body.

4. The vehicle body structure according to claim 3, wherein
the air guide panel includes an inclined portion inclined downward toward the rear, and
the inclined portion overlaps the stabilizer in the vertical direction.

5. The vehicle body structure according to claim 4, wherein
the air guide panel includes an opening portion formed in the inclined portion to open rearward.

6. The vehicle body structure according to claim 5, wherein the opening portion is located upward of a vertical center of the fan.

7. The vehicle body structure according to claim 6, wherein the opening portion is located downward of the upper frame.

8. The vehicle body structure according to claim 7, wherein the opening portion is connected to the cross member.

9. The vehicle body structure according to claim 1,
further comprising left and right suspension frames respectively supporting the left and right front suspension arms,
wherein
the left and right suspension frames are each formed in an inverted U shape as seen in a side view of the vehicle body, and
the cross member is connected to undersides of the respective suspension frames to bridge between the suspension frames.

10. The vehicle body structure according to claim 9, wherein
the air guide panel has a depressed portion, and
the suspension frame is connected to an air guide panel support member located in the depressed portion.

11. The vehicle body structure according to claim 9, wherein one end of each of left and right dampers forming partially left and right suspensions is attached to the cross member.

* * * * *